(12) United States Patent
Loenner et al.

(10) Patent No.: US 7,971,495 B2
(45) Date of Patent: Jul. 5, 2011

(54) MEASURING A TENSILE FORCE (75) Inventors: Wolfgang Loenner, Stadtbergen (DE); Thomas Roessle, Gersthofen-Batzenhofen (DE); Roland Palatzky, Neusaess (DE)

(73) Assignee: Texmag GmbH Vertriebsgesellschaft, Thalwil (CH)

( * ) Notice: Subject to any disclaimer, the term of this patent is extended or adjusted under 35 U.S.C. 154(b) by 68 days.

(21) Appl. No.: 11/943,295

(22) Filed: Nov. 20, 2007

(65) Prior Publication Data
US 2008/0115590 A1 May 22, 2008

(30) Foreign Application Priority Data
Nov. 20, 2006 (EP) .................................. 06024039

(51) Int. Cl.
G01L 1/22 (2006.01)
G01L 1/00 (2006.01)

(52) U.S. Cl. ......... 73/862.474; 73/862.451; 73/862.471; 73/862.473

(58) Field of Classification Search ............. 73/862.474, 73/862.42, 862.451, 862.471, 862.473
See application file for complete search history.

(56) References Cited

U.S. PATENT DOCUMENTS

| | | | | |
|---|---|---|---|---|
| 3,554,025 A * | 1/1971 | Andersson et al. | ....... | 73/862.632 |
| 3,739,633 A * | 6/1973 | Saxl | .......... | 73/862.471 |
| 3,763,701 A * | 10/1973 | Wright et al. | .......... | 73/862.474 |
| 4,052,891 A * | 10/1977 | Bartlett | .......... | 73/862.474 |
| 4,130,014 A * | 12/1978 | Eddens | .......... | 73/862.474 |
| 4,188,809 A | 2/1980 | Ishimoto et al. | | |
| 4,326,424 A * | 4/1982 | Koenig | .......... | 73/862.474 |
| RE31,312 E * | 7/1983 | Eddens | .......... | 73/862.474 |
| 4,674,341 A * | 6/1987 | Koenig | .......... | 73/862.474 |
| 4,691,579 A * | 9/1987 | Ekola | .......... | 73/862.473 |
| 4,735,102 A * | 4/1988 | Koenig | .......... | 73/862.474 |
| 4,784,004 A * | 11/1988 | Ekola | .......... | 73/862.474 |
| 4,796,474 A * | 1/1989 | Koenig | .......... | 73/862.632 |
| 4,821,583 A * | 4/1989 | Richards | .......... | 73/862.474 |
| 4,899,599 A * | 2/1990 | Eddens | .......... | 73/862.382 |
| 4,958,525 A * | 9/1990 | Hauer et al. | .......... | 73/862.474 |
| 5,020,381 A * | 6/1991 | Bartlett | .......... | 73/862.471 |
| 5,113,709 A * | 5/1992 | Ekola | .......... | 73/862.638 |
| 5,646,338 A * | 7/1997 | Mercusot et al. | ......... | 73/86 |
| 6,122,978 A * | 9/2000 | Callendrier | .......... | 73/862.474 |
| 6,192,765 B1 * | 2/2001 | Kipping et al. | ......... | 73/862.55 |
| 6,250,146 B1 * | 6/2001 | Callendrier | .......... | 73/159 |
| 6,986,293 B2 * | 1/2006 | Dukart | .......... | 73/862.391 |
| 2004/0079175 A1 * | 4/2004 | Dukart | .......... | 73/862.391 |
| 2004/0244504 A1 | 12/2004 | Yuan et al. | | |
| 2007/0051190 A1 | 3/2007 | Herhaus | | |

FOREIGN PATENT DOCUMENTS

| | | |
|---|---|---|
| BE | 1008135 | 1/1996 |
| BE | 1008135 A3 | 1/1996 |
| DE | 28 13719 A1 | 10/1978 |
| DE | 42 04231 | 8/1993 |
| DE | 42 04231 A1 | 8/1993 |
| DE | 43 32 588 | 3/1995 |
| EP | 0 621 469 | 10/1994 |
| EP | 0 621 469 | 12/1997 |

* cited by examiner

OTHER PUBLICATIONS

Office action dated Dec. 22, 2008 from corresponding EP application 06024039.7.

*Primary Examiner* — Lisa M. Caputo
*Assistant Examiner* — Jonathan Dunlap
(74) *Attorney, Agent, or Firm* — Fish & Richardson P.C.

(57) ABSTRACT

An apparatus can measure a tensile force in a continuously running material, such as a material web or strand. The apparatus can facilitating an improved absorption of force and a more precise measurement while at the same time enabling simpler manufacture and easier installation.

32 Claims, 5 Drawing Sheets

MEASURING A TENSILE FORCE

CROSS-REFERENCE TO RELATED APPLICATION(S)

This application claims priority to EP Application No. 06024039.7 filed on Nov. 20, 2006 by applicant Texmag GmbH Vertreibsgesellschaft. The content of this earlier application is incorporated herein by reference.

TECHNICAL FIELD

This document pertains to an apparatus to measure a tensile force within a material web or a material strand. This document also pertains to a method that uses an apparatus to measure a tensile force within a material web or a material strand, as well as a system that comprises such an apparatus.

BACKGROUND

There are known apparatuses in the prior art to measure a tensile force within a material web or a material strand.

EP 0 621 469 B1 discloses a tensile force measuring device to measure tensile forces in continuously running materials, in particular material webs or threads. This tensile force measuring device is located on a fixed clamped shaft axis and comprises a clamping area with a massive closed ring with a penetration hole, and a bearing area that can move freely in relation to the shaft in the direction of force. The clamping area and bearing area are connected together by a flexible spring.

Concerning the massive, closed ring in the clamping area, this design requires very high manufacturing precision (e.g., very small manufacturing tolerances). In addition, it is difficult to mount the tensile force measurement device onto the shaft axis.

SUMMARY

Some embodiments of the present invention provide an apparatus to measure a tensile force within one or more material webs or material strands. In such circumstances, the apparatus can facilitate an improved absorption of force and a more precise measurement while at the same time enabling simpler manufacture and easier installation. Particular embodiments provide an apparatus to measure a tensile force within one or more material webs or material strands of minimal width.

Some embodiments of the apparatus described herein can be used to measure a tensile force within a material web or a material strand, in particular in systems to convey and/or process material webs or material strands (e.g., continuously running materials). The apparatus can also measure a force that is exerted by the material web or material strand on the apparatus. Alternatively, a transmitted force resulting from the force exerted by the material web or material strand on the apparatus can also be measured.

In certain embodiments, the apparatus comprises a roller barrel, at least one bearing on which the roller barrel is rotatably mounted, and at least one first force transfer element to transfer the transmitted force. The first force transfer element is designed to react to the transmitted force with an elongation, compression or other shape change in a direction parallel to the axis of rotation of the at least one roller barrel. The at least one bearing can be a rolling bearing, in particular a ball bearing, in particular a self-aligning ball bearing. The diameter of the roller barrel can be between 40 mm and 200 mm, in particular between 60 mm and 120 mm.

Furthermore, in some embodiments the apparatus comprises at least one sensor that is connected to the first force transfer element. In an exemplary embodiment, the sensor is made up of a strain gauge. The first force transfer element can comprise at least one elastic bridge element, on which at least one of the sensors is placed. If a bridge is used with the strain gauge, the transmitted force elastically bends the bridge and elongates or compresses the strain gauge. Here, the term "element" is intended to mean that the bridge element can also be an integral part of the first force transfer element.

The apparatus can be mounted on a shaft that is located inside the associated roller barrel and aligned with the axial longitudinal extension thereof. The first force transfer element is moveably placed on the shaft at a first end (bearing area) such that the first end can deflect toward the shaft in a direction perpendicular to the axis of rotation when the forces are applied. This is accomplished by providing sufficient radial play in this area between the first force transfer element and the shaft. The first end of the first force transfer element can be a radially extending element, in particular an annular element. At its second end (clamping area), the first force transfer element sits fixed against the shaft. The shaft can be connected to a support on one side or on both sides.

In some embodiments, the second end of the first force transfer element, which sits fixed against the shaft, is designed with at least two parts. The second end of the force transfer element can in the process sit against the shaft along at least three contact surfaces. In an exemplary embodiment, the inside of each of the two parts can sit against the shaft along at least two contact surfaces, wherein in the area between two contact surfaces an amount of play is formed between the inside of the part and the shaft. Furthermore, the second end can have a penetration hole in order to solidly connect the first force transfer element to the shaft, in particular by means of a screwed connection.

Through this arrangement, a simpler means of manufacturing and assembly is facilitated. The first force transfer element can have larger manufacturing tolerances near its second end and at the same time be simpler to install since it adjusts to the shaft flexibly in this area. At the same time, a precise measurement is also ensured since twisting of the first force transfer element cannot occur as a result of transmitted forces because of the fixation of the shaft at the contact surfaces. Moreover, a rigid connection to the shaft and thus a higher bending resistance is achieved near the second end of the first force transfer element, whereupon the characteristic frequency of the arrangement in this area increases. Vibrational excitation of the apparatus through shaft rotation thus leads to a frequency that is considerably below the characteristic frequency of the arrangement, which improves the vibrational behavior in the area of the second end of the first force transfer element.

The contact surfaces of the second end can be flat here. It can be advantageous for the extensions of two contact surfaces of a part of the second end of the first force transfer element to have an angle in the range of 90° to 140°, in particular in the range of 105° to 115°.

In particular embodiments, the apparatus comprises at least a second force transfer element that extends inside the associated roller barrel and that is connected to the first force transfer element. This connection can be made by designing a retaining or positioning ring in the first force transfer element on one side and a clamping ring on the other side that fits into a notch of the first force transfer element. However, other conventional connection techniques could be used. Alternatively, this connection can also be understood to include making the second force transfer element an integral part of the first transfer element.

The second force transfer element can be designed such that it transfers to the first force transfer element a bending moment that is produced through the forces of the material web or material strand and that acts in a direction perpendicular to the axis of rotation of the roller barrel. In the process, the sensor and the first force transfer element can be designed such that they can measure the bending moment that is introduced at a first end of the first force transfer element. In an exemplary embodiment, the second force transfer element to transfer the bending moment comprises at least a cantilevered force transfer element. This can be an integral part of the second force transfer element or can be connected to it. The cantilevered force transfer element can extend in a direction parallel to the axis of rotation of the roller barrel. At least two bearings can be located on the cantilevered force transfer element at a distance from one another relative to its axial longitudinal extension. The advantage of this design is in an improved absorption of force, which can provide and a more precise measurement.

With such a design, a force measurement apparatus can also be provided that has a minimal width and that comprises only a single bearing area or only a single first and/or second force transfer element. At the same time, it is impossible to tilt the roller barrel in the process since the bending moment produced by the forces of the material web or the material strand counteracts the tilting motion. In such an arrangement, the width of the roller barrel along the axial longitudinal extension can be between 70 mm and 200 mm, in particular between 90 mm and 150 mm.

It can be advantageous to locate the at least two bearings on the cantilevered force transfer element symmetric with respect to one another relative to its axial longitudinal extension. Moreover, at least one bearing can be located along the axial longitudinal extension of the associated roller barrel essentially at the same position as the associated second force transfer element and at least one bearing can be located at the cantilever end of the associated cantilevered force transfer element. The cantilevered force transfer element can be a radially extending element, in particular an annular element or a sleeve that is located coaxially inside the roller barrel.

In some embodiments, a "segmented" force measurement apparatus can be provided with at least two roller components located next to one another. With such an apparatus, it is possible to simultaneously measure numerous material webs or material strands running one next to the other. Each roller component is made up of a roller barrel, a first force transfer element and, if present, a second force transfer element. The at least two roller barrels can be slid onto the shaft one after the other and connected to it. The connection can be made in particular using a screwed connection through a penetration hole in the second end of the first force transfer element. However, other conventional connection techniques can be used as well. In an exemplary embodiment, each roller component comprises only a single bearing area and a single first and/or second force transfer element as described above. In this way, the roller components arranged individually next to one another have only a minimal width and a compact and simple design of a "segmented" force measurement apparatus can thus be realized.

It should be emphasized that although particular emobidments can provide a force measurement apparatus of minimal width that comprises only a single bearing area or only a single first and/or second force transfer element, an apparatus with at least two first force transfer elements and, if present, at least two second force transfer elements is likewise within the protective scope of the invention. In the process, it can be advantageous to arrange the at least two first force transfer elements, along with the corresponding second force transfer elements, if present, symmetric with respect to one another in the direction of the axial longitudinal extension of the roller barrel. The width of the roller barrel along the axial longitudinal extension of such an arrangement can be between 120 mm and 800 mm, in particular between 150 mm and 600 mm.

The invention further comprises a method to measure a force of a material web or a material strand involving a force measurement apparatus as described above according to the invention. The sensor can detect the reaction of the at least one first force transfer element through elongation, compression or other shape change in a direction parallel to the axis of rotation of the at least one roller barrel.

A measurement circuit can be used that converts the elongation, compression or other shape change of the first force transfer element detected by the sensor into a measurement signal. Furthermore, an electrical amplification circuit to process the measurement signal can be used. The measurement signal can then be processed in a processing unit and thus an output signal can be produced that represents the force of the material web or material strand. In a display unit, a value can then be displayed to the user corresponding to the output signal or measurement signal.

In an exemplary embodiment, a sensor as described above is a strain gauge whose resistance is changed through elongation, compression or other shape change of the at least one first force transfer element. The change in resistance of the strain gauge, which is proportional to the force, can be converted to an output signal through a bridge circuit, in particular a Wheatstone bridge circuit.

DESCRIPTION OF DRAWINGS

FIG. 3b shows a cross section of a first force transfer element according to FIG. 3a.

FIG. 3c shows a top view of a first force transfer element according to FIG. 3a.

DETAILED DESCRIPTION OF ILLUSTRATIVE EMBODIMENTS

Figure 1:
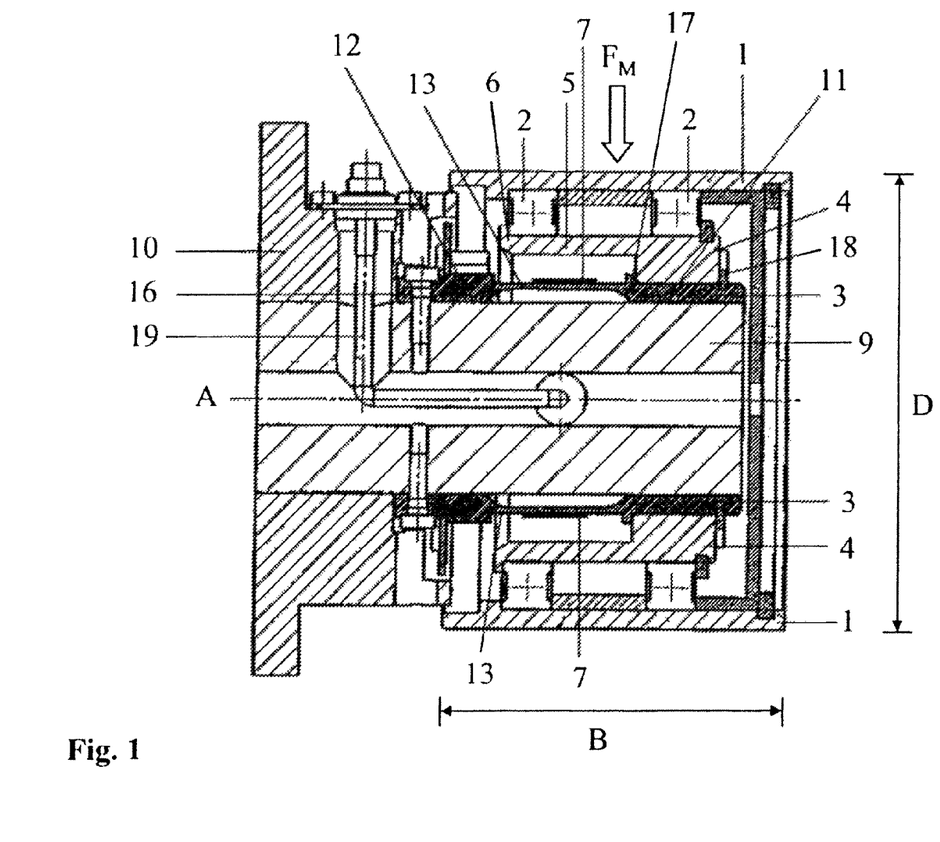
FIG. 1 shows a longitudinal section of an apparatus to measure a tensile force within a material web according to one embodiment of the present invention.
Figure 2:
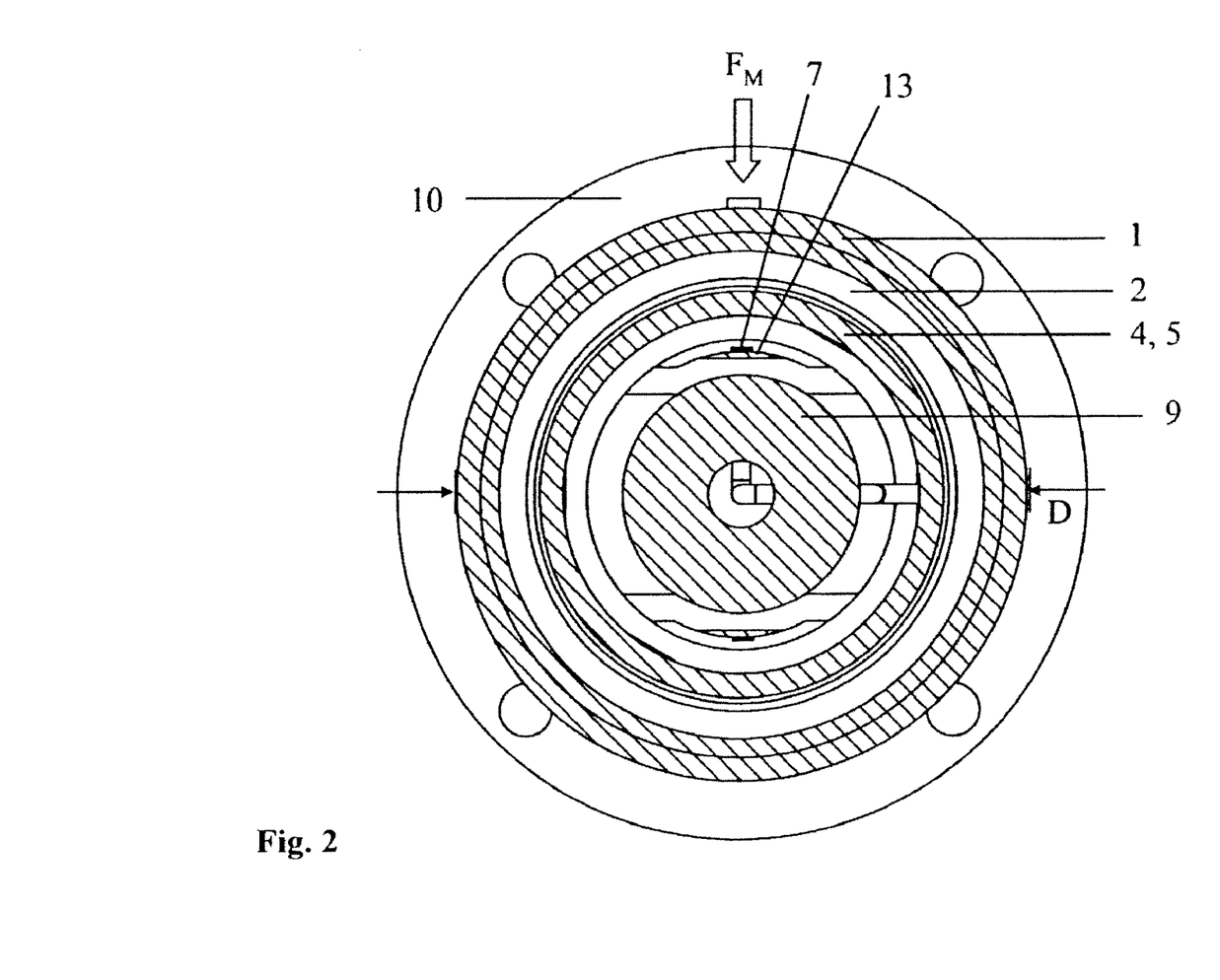
FIG. 2 shows the cross section of an apparatus according to FIG. 1.

FIG. 1 and FIG. 2 show a longitudinal section and a cross section of the apparatus according to an embodiment of the present invention. Such an apparatus is used to measure a tensile force within a material web or a material strand or a force $F_M$ that is exerted by the material web or material strand on the apparatus. Alternatively, a transfer force $F_Ü$ can be measured that results from the force $F_M$ exerted by the material web or material strand on the apparatus. Such apparatuses are used in particular in systems to convey and/or process material webs or material strands.

The apparatus according to FIG. 1 and FIG. 2 comprises a roller barrel 1, two bearings 2 on which the roller barrel is rotatably mounted, and a first force transfer element 3 to transfer the transmitted force $F_Ü$. The first force transfer element 3 is designed to react to the transmitted force $F_Ü$ in a direction parallel to the axis of rotation A of the roller barrel 1 with an elongation, compression or other shape change. The bearings 2 can be rolling bearing, in particular ball bearings or self-aligning ball bearings. However, other conventional types of bearings can also be used. The diameter D of the roller barrel 1 can be between 40 mm and 200 mm, in particular between 60 mm and 120 mm.

Figure 5:
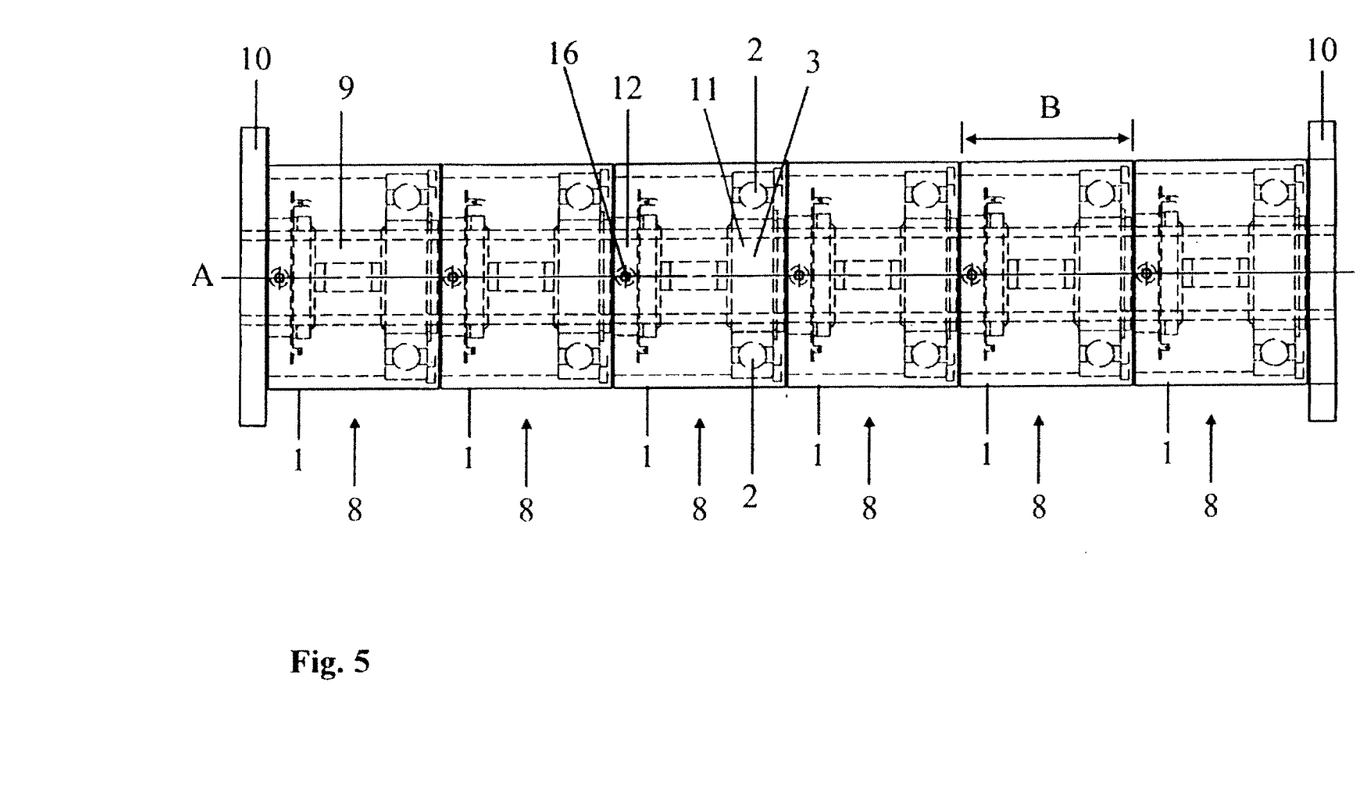
FIG. 5 shows a top view of an apparatus to measure the tensile forces inside multiple material webs using multiple roller components (six in this case) according to another embodiment of the present invention.

The apparatus is mounted on a shaft 9 that is located inside the associated roller barrel 1 in the direction of the axial longitudinal extension thereof. The first force transfer element 3 is located moveably on the shaft 9 at a first end 11 (bearing area; in FIG. 1 it is the right end) by providing sufficient radial play (cannot be seen to scale in FIG. 1) in this area between the first force transfer element 3 and the shaft 9. When force $F_M$ which is exerted by the material web or material strand on the apparatus, or the transmitted force $F_Ü$ resulting therefrom is applied, the first end 11 of the first force transfer element 3 deflects downward due to the sufficient amount of radial play. The first end of the first force transfer element is a radially extending element or an annular element. At its second end 12 (clamping area; in FIG. 1 it is the left end), the first force transfer element 3 is fixed to the shaft 9. The shaft 9 can be connected to a support 10 on either one side, as shown in FIG. 1, or on both sides as shown in FIG. 5.

Furthermore, the apparatus comprises at least one sensor 7 that is connected to the first force transfer element 3. The sensor 7 can detect the reaction of the first force transfer element 3 to an elongation, compression or other shape change in a direction parallel to the axis of rotation A of the roller barrel 1. In the process, the first force transfer element 3 can comprise at least one elastic element, in particular a bridge 13 as shown in FIG. 1, on which at least one of the sensors 7 is located. The sensor 7 in FIG. 1 is made up of a strain gauge (see FIG. 3c also). As described above, the first end 11 of the first force transfer element 3 deflects downward when force $F_M$ or $F_Ü$ is applied due to the sufficient radial play, thus bending the two bridges 13 such that the upper strain gauge 7 is elongated and the lower strain gauge 7 is compressed. The resistance of the strain gauge is modified due to the shape change.

The electrical signal produced in this way can be fed out through a cable feed 19, which in particular is fed through a hollow interior of the shaft 9. The resistance change of the strain gauge, which is proportional to the force, can then be converted to an output signal using a bridge circuit (not shown), in particular a Wheatstone bridge circuit. A measurement circuit (not shown) can be used that converts the elongation, compression or other shape change of the first force transfer element 3 detected by sensor 7 to a measurement signal. Furthermore, an electrical amplification circuit (not shown) can be used to prepare the measurement signal. The measurement signal can then be processed in a processing unit (not shown), and thus an output signal can be produced that represents the force of the material web or material strand. In a display unit (not shown), a value can then be displayed to the user that corresponds to the output signal or measurement signal.

In the embodiment of the present invention shown in FIG. 1 and FIG. 2, the apparatus further comprises at least one second force transfer element 4 that extends inside the associated roller barrel 1 and that is connected to the first force transfer element 3. This connection can, as shown in FIG. 1, be achieved by designing a retaining or positioning ring 17 in the first force transfer element 3 on one side and a clamping ring 18 on the other side that fits into a notch of the first force transfer element 3. However, other conventional connection techniques can also be used. Alternatively, this connection can also be understood to include making the second force transfer element 4 an integral part of the first transfer element 3.

The second force transfer element 4 can be designed such that it transfers to the first force transfer element 3 a bending moment M produced by the forces $F_M$ of the material web or the material strand, said bending moment acting in a direction perpendicular to the axis of rotation A of the roller barrel 1. In the process, the sensor 7 and the first force transfer element 3 can be designed such that they can measure the bending moment M introduced at a first end 11 of the first force transfer element. In an exemplary embodiment, the second force transfer element 4 to transfer the bending moment M comprises a cantilevered force transfer element 5 as shown in FIG. 1. This is an integral part of the second force transfer element 4. Alternatively, however, it can be connected to it as well. The cantilevered force transfer element 5 extends in a direction parallel to the axis of rotation A of the roller barrel 1. There are two bearings 2 located on the cantilevered force transfer element 5 that are separated from one another relative to its axial longitudinal extension. The advantage of this design is its improved absorption of force compared to the prior art.

Such a design makes it possible to also provide a force measurement apparatus with a smaller width B, comprising only a single bearing area 12 or only a single first 3 and/or second 4 force transfer element. At the same time, it is not possible to tilt the roller barrel 1 since the bending moment M produced by the forces $F_M$ of the material web or material strand counteract the tilting motion. In such an arrangement, the width B of the roller barrel 1 along the axial longitudinal extension can be between 70 mm and 200 mm, in particular between 90 mm and 150 mm.

As shown in FIG. 1, it is advantageous for improved force distribution to arrange the at least two bearings 2 on the cantilevered force transfer element 5 symmetrically with respect to one another relative to the transfer element's axial longitudinal extension. One bearing 2 (the right bearing in FIG. 1) is located along the axial longitudinal extension of the associated roller barrel 1 essentially at the same position as the associated second force transfer element 4; in this case in the area where the second force transfer element 4 is connected to the first end 11 of the first force transfer element 3. The other bearing 2 (the left bearing in FIG. 1) is located at the cantilever end 6 of the associated cantilevered force transfer element 5. The cantilevered force transfer element 5 is a sleeve here that is located coaxially inside the roller barrel 1.

Figure 3A:
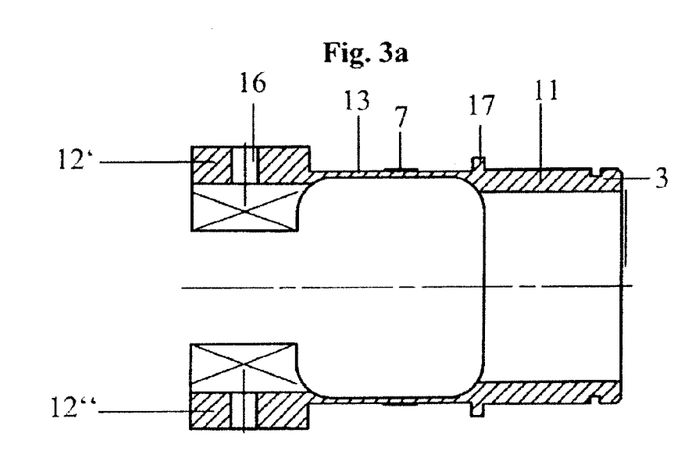
FIG. 3a shows a longitudinal section of a first force transfer element according to an embodiment of the present invention.

An embodiment of the first force transfer element 3 is now explained with reference to FIG. 3a through 3c, which shows a longitudinal section, a cross section and a top view, respectively, of the first force transfer element 3. The second end 12 of the first force transfer element 3, which sits solidly against the shaft 9, is designed in two parts 12', 12". The inner side of each of the two parts 12', 12" lies against the shaft 9 at two contact surfaces 14, wherein in the area between the two contact surfaces 14 an amount of play 15 is created between the inside of the part 12', 12" and the shaft 9. In general, at least three contact surfaces 14 of the second end 12 must sit against the shaft 9 so that the first force transfer element 3 sits solidly against the shaft 9 there. As shown in FIGS. 3a and 3c, the second end has a penetration hole 16 in order to connect the first force transfer element 3 solidly to the shaft 9 using a screw connection.

This arrangement facilitates a simpler manufacturing process and installation. The first force transfer element 3 can have larger manufacturing tolerances at its second end 12, and is at the same time simpler to install since it adjusts to the shaft 9 in this area. At the same time, a precise measurement is also guaranteed since twisting of the first force transfer element 3 due to transmitted forces $F_Ü$ cannot occur since the shaft 9 is fixed at the contact surfaces 14. Moreover, a rigid connection to the shaft 9 and thus higher bending resistance is attained in the area of the second end 12 of the first force transfer element 3, which also increases the characteristic frequency of the arrangement in this area. Vibrational excitation of the apparatus due to rotation of the roller 1 thus leads to a frequency that is considerably below the characteristic frequency of the arrangement, resulting in the improvement of the vibrational behavior in the area of the second end 12 of the first force transfer element 3.

Figure 3B:
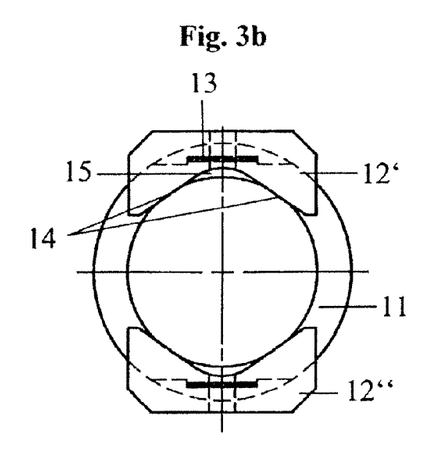
Figure 3C:
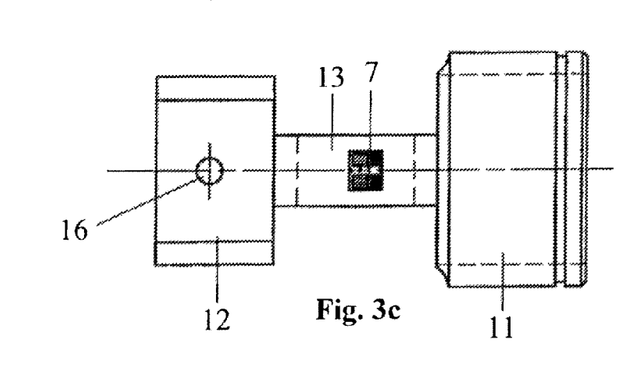

The contact surfaces 14 are designed to be flat here, as can be seen in FIG. 3b. However, other shapes of the contact surfaces are conceivable as long as it is still guaranteed that the first force transfer element 3 sits solidly against the shaft 9 at its second end 12. It can be advantageous for the extensions of two contact surfaces 14 of a part 12', 12'' of the second end 12 of the first force transfer element 3 to form an angle in the range of 90° to 140°, in particular in the range of 105° to 115°. In FIG. 3b, a corresponding angle of about 110° is shown. Here, the two contact surfaces 14 transition into one another in the shape of a parabola and can in such manner form the play 15 between the inside of the parts 12', 12'' and the shaft 9.

It should be emphasized that although some embodiments can provide a force measurement apparatus of low width B that comprises only a single bearing area 11 or only a single first 3 and/or second 4 force transfer element, an apparatus with at least two first force transfer elements 3 and, if present, at least two second force transfer elements 4 is likewise within the scope of the invention. A longitudinal section of such an apparatus with two symmetrically arranged first force transfer elements 3 is shown in FIG. 4.

The two first force transfer elements 3 are symmetrically arranged with respect to one another in the direction of the axial longitudinal extension of the roller barrel 1. The width B of the roller barrel 1 in the axial longitudinal extension of such an arrangement can be between 120 mm and 800 mm, in particular between 150 mm and 600 mm.

Figure 4:
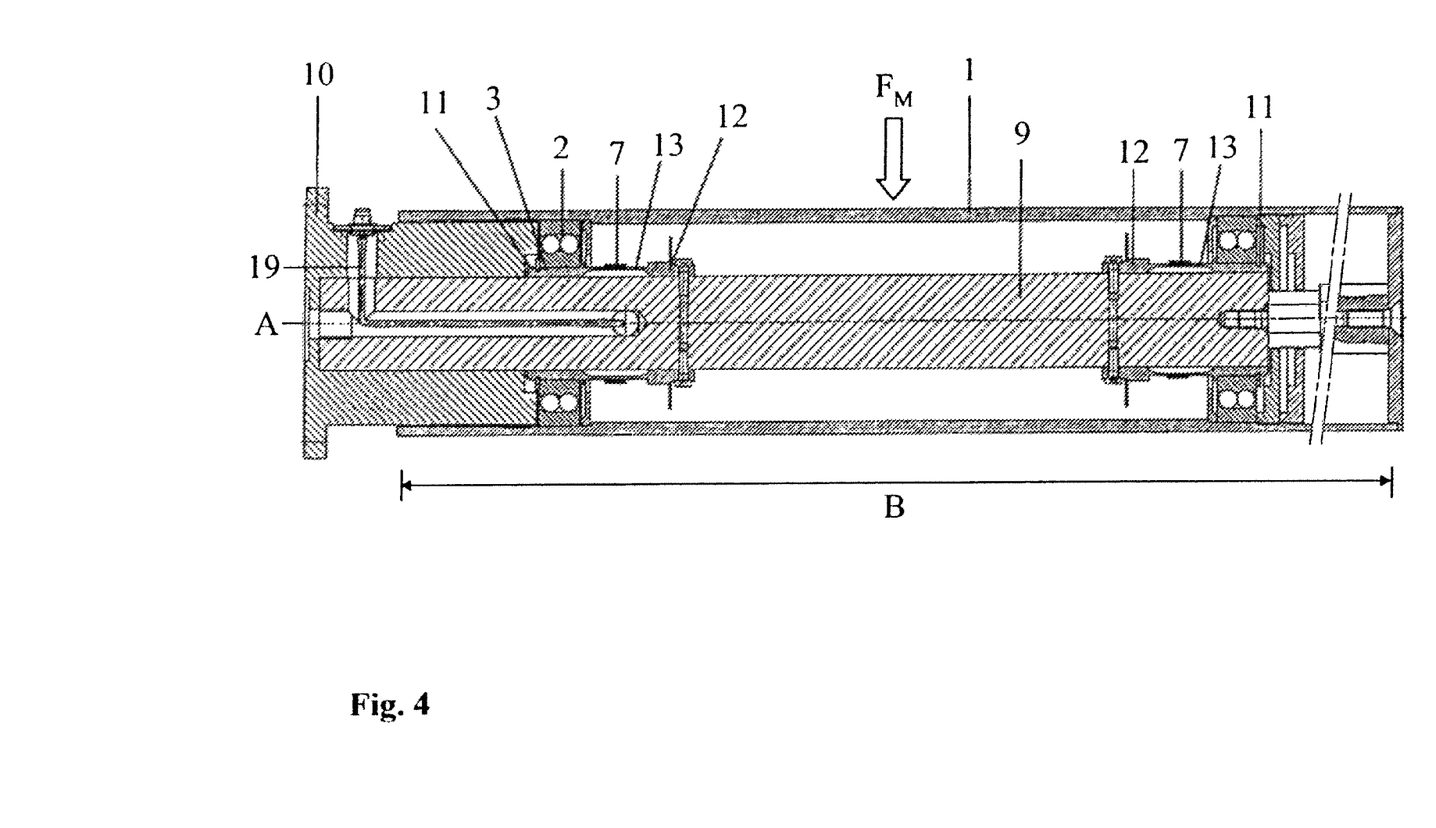
FIG. 4 a longitudinal section of an apparatus to measure a tensile force within a material web with two symmetrically arranged first force transfer elements according to an embodiment of the present invention.

It is advantageous to provide overload protection both in the embodiment with a single first 3 and/or second 4 force transfer element (see FIG. 1) and in the embodiment with two first 3 and/or second 4 force transfer elements, as just described (see FIG. 4). These embodiments take into account a possible axial movement of the first 3 and/or second 4 force transfer element in the dimensioning of the apparatus. The support 10 and/or a corresponding other limit element can be connected to the shaft 9 in such a way that the arrangement can be designed for maximum possible or allowable overload. To this end, an appropriate amount of play can be provided between the first end 11 of the first force transfer element 3 and the support 10 and/or a corresponding other limit element, as shown in FIG. 1 and FIG. 4.

FIG. 5 shows a top view of an apparatus to measure tensile forces within multiple material webs using multiple roller components 8 according to another embodiment of the present invention. In this representation, the "segmented" force measurement apparatus comprises six such roller components 8. Each roller component 8 is made up of a roller barrel 1, a first force transfer element 3 and, if present, a second force transfer element 4. The roller barrels 1 are arranged one after the other in relation to their axis of rotation A. The roller components 8 can be slid onto the shaft 9 one after the other and connected to it. The connection is accomplished here by means of a screwed connection using a penetration hole 16 in the second end 12 of the first force transfer element 3. However, other conventional connection techniques can also be used.

A number of embodiments of the invention have been described. Nevertheless, it will be understood that various modifications may be made without departing from the spirit and scope of the invention. Accordingly, other embodiments are within the scope of the following claims.

What is claimed is:

1. A tensile force measurement apparatus for determining a tensile force within a material web or strand, the apparatus comprising:
a roller barrel;
at least one bearing upon which the at least one roller barrel is rotatably mounted;
a first force transfer element to that reacts to a transmitted force resulting from a force exerted on the roller barrel by a material web or strand, the first force transfer element to react to the transmitted force with an elongation, compression or other shape change in a direction parallel to the axis of rotation of the at least one roller barrel, wherein the first force transfer element comprises a first cantilevered force transfer element that extends in a first direction parallel to the axis of rotation of the roller barrel;
a sensor that is connected to the at least one first force transfer element to output a sensor signal in response to the elongation, compression or other shape change of the first force transfer element;
a second force transfer element that extends inside the roller barrel, wherein the second force transfer element transmits to the first force transfer element a bending moment produced by the force exerted on the apparatus by the material web or strand, the bending moment to act in a direction perpendicular to the axis of rotation of the roller barrel, wherein the second force transfer element comprises a second cantilevered force transfer element that extends in a second direction parallel to the axis of rotation of the roller barrel; and
a connection between the first force transfer element and the second force transfer element,
wherein the first direction is opposite to the second direction.

2. The apparatus according to claim 1, wherein the sensor and the first force transfer element are arranged to measure the bending moment transmitted by the second force transfer element, the bending moment to act in the direction perpendicular to the axis of rotation of the roller barrel and introduced at a first end of the first force transfer element.

3. The apparatus according to claim 1, wherein at least two bearings are arranged on the second cantilevered force transfer element at a distance from one another relative to a longitudinal extension of the second cantilevered force transfer element.

4. The apparatus according to claim 1, further comprising a shaft that is located inside the roller barrel, wherein the first force transfer element is mounted on the shaft.

5. The apparatus according to claim 4, wherein a first end of the first force transfer element is movable on the shaft such that it can deflect toward the shaft in a direction perpendicular to the axis of rotation of the roller barrel, and a second end of the first force transfer element is generally non-movable on the shaft.

6. The apparatus according to claim 5, wherein the second end of the first force transfer element is made up of at least two mounting arms.

7. The apparatus according to claim 6, wherein the second end of the first force transfer element is fixed against the shaft along at least two contact surfaces.

8. The apparatus according to claim 7, wherein the contact surfaces of the second end of the first force transfer element are flat.

9. The apparatus according to claim 1, wherein the roller barrel, the first force transfer element, and the second force transfer element are arranged coaxially along the axis of rotation of the roller barrel.

10. The apparatus according to claim 1, wherein the first force transfer element comprises an elastically deformable bridge element on which the sensor is connected.

11. The apparatus according to claim 1, wherein the sensor is a strain gauge.

12. The apparatus according to claim 1, further comprising a processing unit to receive the output sensor signal from the sensor in response to the elongation, compression or other shape change of the first force transfer element, wherein the processing unit is to output information to a display unit indicative of a tensile force within the material web or strand.

13. A system comprising a plurality of the apparatuses of claim 1 arranged on a shaft in a side-by-side configuration, wherein the system is operable to measure tensile forces within multiple material webs or strands running one next to one another, each of the material webs or strands exerting a force upon a corresponding roller barrel.

14. The apparatus according to claim 1, wherein the first force transfer element comprises a first end that is movably arranged on the shaft and a second end that is fixedly mounted to the shaft, the second end of the first force transfer element comprising at least two mounting arms each providing a respective contact surface with the shaft, wherein the contact surfaces are exterior boundaries of the mounting arms and contact the shaft with the second end fixedly mounted to the shaft, wherein the at least two mounting arms of the second end of the first force transfer element are both connected to the first end of the first force transfer element.

15. The apparatus according to claim 1, wherein the first force transfer element comprises a first end that is movably arranged on the shaft and a second end that is fixedly mounted to the shaft, the second end of the first force transfer element comprising at least two mounting arms each providing a respective contact surface with the shaft, wherein the contact surfaces are exterior boundaries of the mounting arms and contact the shaft with the second end fixedly mounted to the shaft, wherein the at least two mounting arms of the second end of the first force transfer element are both connected to the first end of the first force transfer element.

16. The apparatus according to claim 1, wherein:
the first force transfer element and the second force transfer element each comprise an elongate section along the axis of the roller barrel;
the second force transfer element is connected to the first force transfer element at a connection; and
the tensile force measurement apparatus comprises a first and second bearing upon which the at least one roller barrel is rotatably mounted;
the first bearing disposed directly radially outward from the connection of the second force transfer element to the first force transfer element relative to the axis of the roller barrel; and
the second bearing is displaced longitudinally from the connection of the second force transfer element to the first force transfer element relative to the axis of the roller barrel.

17. A method comprising:
using a tensile force measurement apparatus for determining a tensile force within a material web or strand, the apparatus comprising
a roller barrel,
at least one bearing upon which the at least one roller barrel is rotatably mounted,
a first force transfer element to that reacts to a transmitted force resulting from a force exerted on the roller barrel by a material web or strand, the first force transfer element to react to the transmitted force with an elongation, compression or other shape change in a direction parallel to the axis of rotation of the at least one roller barrel, wherein the first force transfer element comprises a first cantilevered force transfer element that extends in a first direction parallel to the axis of rotation of the roller barrel,
a sensor that is connected to the at least one first force transfer element to output a sensor signal in response to the elongation, compression or other shape change of the first force transfer element,
a second force transfer element that extends inside the roller barrel, wherein the second force transfer element transmits to the first force transfer element a bending moment produced by the force exerted on the apparatus by the material web or strand, the bending moment to act in a direction perpendicular to the axis of rotation of the roller barrel, wherein the second force transfer element comprises a second cantilevered force transfer element that extends in a second direction parallel to the axis of rotation of the roller barrel; and
a connection between the first force transfer element,
the using comprising measuring the tensile force within the material web or strand
wherein the first direction is opposite to the second direction.

18. The method according to claim 17, further comprising detecting the elongation, compression or other shape change of the first force transfer element with the sensor, and outputting a sensor signal indicative of the elongation, compression or other shape change of the first force transfer element.

19. The method according to claim 18, further comprising processing the sensor signal and displaying a value indicative of a tensile force within the material web or strand in a display unit.

20. A tensile force measurement apparatus for determining a tensile force within a material web or strand, the apparatus comprising:
a roller barrel;
at least one bearing upon which the at least one roller barrel is rotatably mounted;
a shaft arranged inside the roller barrel and extending in an axial direction;
a first force transfer element that reacts to a transmitted force resulting from a force exerted on the apparatus by a material web or strand, the first force transfer element to react to the transmitted force with an elongation, compression or other shape change in a direction parallel to the axis of rotation of the at least one roller barrel; and
a sensor that is connected to the at least one first force transfer element to output a sensor signal in response to the elongation, compression or other shape change of the first force transfer element,
wherein the first force transfer element comprises a first end that is movably arranged on the shaft and a second end that is fixedly mounted to the shaft, the second end of the first force transfer element comprising at least two mounting arms each providing a respective contact surface with the shaft, wherein the contact surfaces are exterior boundaries of the mounting arms and contact the shaft with the second end fixedly mounted to the shaft, wherein the at least two mounting arms of the second end of the first force transfer element are both connected to the first end of the first force transfer element.

21. The apparatus according to claim 20, further comprising a second force transfer element that extends inside the roller barrel and that is connected to the first force transfer element, wherein the second force transfer element transmits to the first force transfer element a bending moment produced by the force exerted on the apparatus by the material web or strand.

22. The apparatus according to claim 21, wherein the roller barrel, the first force transfer element, and the second force transfer element are arranged coaxially along the axis of rotation of the roller barrel.

23. The apparatus according to claim 20, wherein the first force transfer element comprises an elastically deformable bridge element on which the sensor is connected.

24. The apparatus according to claim 20, further comprising a processing unit to receive the output sensor signal from the sensor in response to the elongation, compression or other shape change of the first force transfer element, wherein the processing unit is to output information to a display unit indicative of a tensile force within the material web or strand.

25. A system comprising a plurality of the apparatuses of claim 20 arranged on a shaft in a side-by-side configuration, wherein the system is operable to measure tensile forces within multiple material webs or strands running one next to one another, each of the material webs or strands exerting a force upon a corresponding roller barrel.

26. The apparatus according to claim 20, wherein:
the at least two mounting arms are spaced apart in a radial direction to an extent sufficient to receive the shaft; and
the respective contact surfaces are each on a radially inner side of the respective mounting arm to contact the shaft with the second end fixedly mounted to the shaft.

27. The apparatus according to claim 20, wherein the positions of contact between the contact surfaces of the mounting arms are adjustable to the shaft.

28. The apparatus according to claim 20, wherein the contact surfaces are flat.

29. A method comprising:
using a tensile force measurement apparatus for determining a tensile force within a material web or strand, the apparatus comprising
a roller barrel,
at least one bearing upon which the at least one roller barrel is rotatably mounted,
a shaft arranged inside the roller barrel and extending in an axial direction,
a first force transfer element that reacts to a transmitted force resulting from a force exerted on the apparatus by a material web or strand, the first force transfer element reacting to the transmitted force with an elongation, compression or other shape change in a direction parallel to the axis of rotation of the at least one roller barrel, and
a sensor that is connected to the at least one first force transfer element to output a sensor signal in response to the elongation, compression or other shape change of the first force transfer element,
wherein the first force transfer element comprises a first end that is movably arranged on the shaft and a second end that is fixedly mounted to the shaft, the second end of the first force transfer element comprising at least two mounting arms each providing a respective contact surface with the shaft, the using comprising measuring a tensile force within a material web or strand, wherein the contact surfaces are exterior boundaries of the mounting arms and contact the shaft with the second end fixedly mounted to the shaft, wherein the at least two mounting arms of the second end of the first force transfer element are both connected to the first end of the first force transfer element.

30. The method according to claim 29, wherein:
the at least two mounting arms are spaced apart in a radial direction to an extent sufficient to receive the shaft; and
the respective contact surfaces are each on the radially inner side of the respective mounting arm to contact the shaft with the second end fixedly mounted to the shaft.

31. A tensile force measurement apparatus for determining a tensile force within a material web or strand, the apparatus comprising:
a shaft having an axis;
a first force transfer element comprising a first end that is movable relative to the shaft and a second end that is fixedly mounted to the shaft, the first end of the first force transfer element disposed longitudinally displaced from the second end of the first force transfer relative to the axis of the shaft,
a second force transfer element comprising a first end that is connected to the first end of the first force transfer element at a connection and a second end that is movable relative to the first force transfer element, the first end of the second force transfer element disposed longitudinally displaced from the second end of the second force transfer element relative to the axis of the shaft with the second end of the second force transfer element on the same side of the connection between the first ends of the first and second force transfer elements as the second end of the first force transfer element;
a sensor that is connected to the at least one first force transfer element to output a sensor signal in response to the elongation, compression or other shape change of the first force transfer element;
a roller barrel; and
at least one bearing upon which the at least one roller barrel is rotatably mounted.

32. The apparatus according to claim 31, wherein the at least one bearing comprises:
a first bearing disposed directly radially outward from the connection between the first ends of the first and second force transfer elements relative to the axis of the roller barrel; and
a second bearing is displaced longitudinally from the connection between the first ends of the first and second force transfer elements relative to the axis of the roller barrel.

* * * * *

UNITED STATES PATENT AND TRADEMARK OFFICE
CERTIFICATE OF CORRECTION

| | | |
|---|---|---|
| PATENT NO. | : 7,971,495 B2 | Page 1 of 1 |
| APPLICATION NO. | : 11/943295 | |
| DATED | : July 5, 2011 | |
| INVENTOR(S) | : Wolfgang Löenner, Thomas Roessle and Roland Palatzky | |

It is certified that error appears in the above-identified patent and that said Letters Patent is hereby corrected as shown below:

In the Claims:

In Column 12, Line 22, Claim 31, after "transfer" insert -- element --.

Signed and Sealed this
Eighteenth Day of October, 2011

David J. Kappos
*Director of the United States Patent and Trademark Office*